United States Patent [19]

Dugat

[11] Patent Number: 4,725,362

[45] Date of Patent: Feb. 16, 1988

[54] TREATMENT TECHNIQUES FOR DRILL FLUIDS, CUTTINGS AND OTHER OIL FIELD WASTES

[76] Inventor: John W. Dugat, P.O. Box 193, Portland, Tex. 78374

[21] Appl. No.: 799,269

[22] Filed: Nov. 18, 1985

[51] Int. Cl.⁴ ............................................. E21B 21/06
[52] U.S. Cl. .................................. 210/710; 210/724; 210/769; 175/66
[58] Field of Search ............... 210/770, 771, 774, 781, 210/788, 922, 710, 723, 724, 732, 769; 175/66, 206, 207; 34/86; 261/DIG. 9

[56] References Cited

U.S. PATENT DOCUMENTS

| | | | |
|---|---|---|---|
| 3,040,822 | 6/1962 | Graham et al. | 175/70 |
| 3,693,733 | 9/1972 | Teague | 175/66 |
| 3,713,499 | 1/1973 | Arscott et al. | 175/66 |
| 3,737,037 | 6/1973 | Bone, III | 210/734 |
| 3,766,997 | 10/1973 | Heilhecker et al. | 175/66 |
| 3,803,806 | 4/1974 | Komline | 210/774 |
| 3,860,019 | 1/1975 | Teague | 210/167 |
| 4,044,820 | 8/1977 | Nobles | 34/86 |
| 4,077,777 | 3/1978 | Henke | 175/66 |
| 4,101,265 | 7/1978 | Broach et al. | 34/86 |
| 4,102,982 | 7/1978 | Weir, Jr. | 261/DIG. 9 |
| 4,139,462 | 2/1979 | Sample, Jr. | 210/774 |
| 4,209,381 | 6/1980 | Kelly, Jr. | 175/66 |
| 4,319,410 | 3/1982 | Heilhecker et al. | 175/207 |
| 4,321,151 | 3/1982 | McMullen | 210/771 |
| 4,366,063 | 12/1982 | O'Connor | 210/747 |
| 4,395,338 | 7/1983 | Rowton | 210/774 |
| 4,411,074 | 10/1983 | Daly | 175/66 |
| 4,480,702 | 11/1984 | Kelly, Jr. | 175/66 |
| 4,501,446 | 2/1985 | Glaser et al. | 210/770 |
| 4,599,117 | 7/1986 | Luxemburg | 175/66 |

Primary Examiner—Peter Hruskoci
Assistant Examiner—Richard D. Jordan
Attorney, Agent, or Firm—Arnold, White & Durkee

[57] ABSTRACT

Method and apparatus for treatment of oilfield wastes, so that the wastes may be disposed of without harm to the environment or may be recovered as valuable products, wherein the wastes are pretreated to enhance separation of solid materials, the solid materials being dried and incinerated to a char solids condition, the char solids and the heating gases being cooled by heat exchange to provide hot air for combustion in the dryer-incinerator, thereby saving heating fuel cost, the gases being scrubbed to remove contaminants, and the condensed water-hydrocarbon phases being separated for reuse or for further treatment for recovery.

4 Claims, 1 Drawing Figure

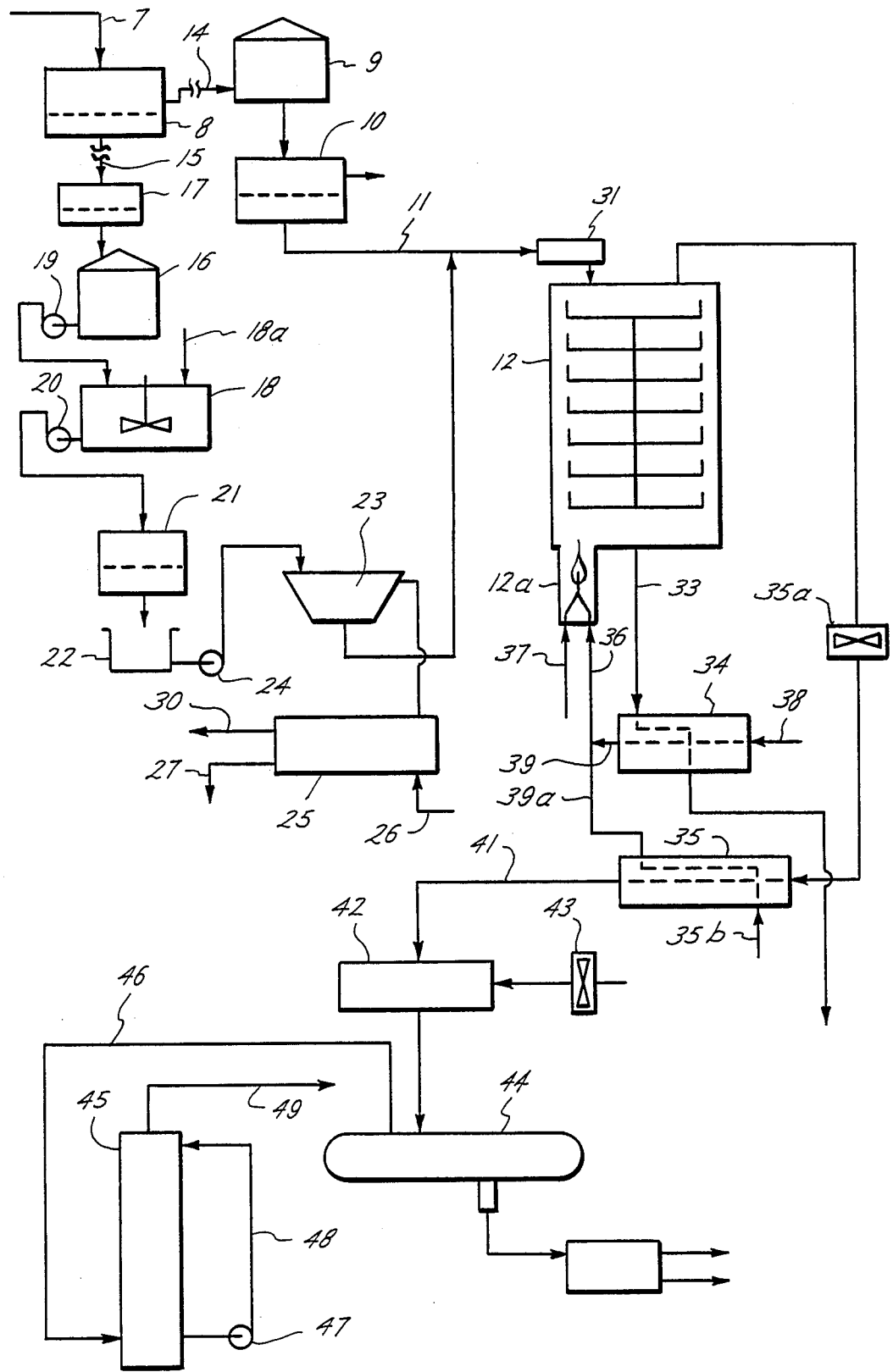

TREATMENT TECHNIQUES FOR DRILL FLUIDS, CUTTINGS AND OTHER OIL FIELD WASTES

In the drilling of wells to provide access to underground petrolium reservoirs, drilling fluids are used to lubricate the drilling apparatus, to remove the cuttings from the drilled hole, and for other purposes. The drilling fluid is circulated downward through the drill pipe, and out of openings in the drill bit, and upward within the bore hole to the surface. The return flow of drilling fluid carries with it drill cuttings from the bottom of the bore hole. The recovered drilling fluid is screened to remove the drill cuttings before being returned to a storage tank for drilling fluid for later reuse. Upon completion of the drilling of a well, the practice in the past has been to impound the used drilling fluids in 'reserve pits', in on-shore locations. The drilling fluids resulting from the drilling of a number of wells may be placed in the same reserve pits. Hence, reserve pits may be expected to contain different types of drilling muds, along with cuttings and other solid wastes, which have been dumped after a drilling operation has been completed. The contents of the reserve pits are collectively called 'oil field wastes'. There have been numerous instances where the reserve pits have failed to contain the oil field wastes, with resulting contamination of aquifers, and other water and land areas.

Government regulations now require proper disposal practice with regard to the oil field wastes. The major polluting constituents in the oil field wastes are hydrocarbons, heavy metals and free caustic. In areas where regulations are strict, the herein disclosed methods and apparatus will be valuable for individuals or companies involved in the disposal of the aforementioned oil field wastes. The invention presents processes and apparatuses for the efficient and ecologically sound disposal of oil field wastes. According to the invention, the wastes are separated into solid and drilling mud slurry components by screening. The solid components are heated to dry and incinerate them. Solids from the slurries are separated by pH adjustment and use of flocculating agents. These separated solids are dried and incinerated along with the aforementioned solid components. Liquid components separated from the solids are separated into petroleum and aqueous components. The petroleum components may be used, if suitable, in preparation of drilling fluids, or may be further separated or refined for recovery of the petroleum constituents.

SUMMARY OF THE INVENTION

According to the invention, oil field wastes are first separated into solid and slurry, or liquid, components. Additional solids are separated from the slurry or liquid components by use of pH adjustments and by use of flocculating agents, the solids being separated by screening and centrifugation. All of the solids are combined and delivered into a dryer-incinerator, wherein the solids are reduced to a char solid state. Heat from the char solids is recovered by transfer to air which is used in producing heated air for the drying-incineration operation. Heat from the flue gases from drying-incineration is also recovered to provide additional heated air for combustion in the heating-incineration operation. This recovery of heat from the heater-incineration operation greatly reduces the cost of operation of the overall process. After being partially cooled by heat transferred to process air, the flue gases are caustic scrubbed to remove sulfur and nitrogen oxides and other acidic constituents, and are then burned in a flare to remove any residual hydrocarbons.

A principle object of the invention is to provide methods and apparatus for pre-treatment and drying-incineration of oil field wastes. Another object of the invention is to provide auxiliary equipment for the upgrading of the quality of the recovered materials. Another object of the invention is to recover hydrocarbon materials from the oil field wastes. Yet another object of the invention is to recover constituents of drilling fluids, namely diesel or or other distillates, barite and clays. A further object of the invention is to produce off gases that are low in pollutants such as sulfur oxides, nitrogen oxides and suspended particulates. Another object of the invention is to condense the recovered hydrocarbons without plugging of the condenser system by which the hydrocarbons are recovered.

The following considerations are important to the process:

(1) The drying-incineration capacity increases with increase of the drying-incineration temperature.
(2) Less hydrocarbons are left in the residue if the temperature of the dryer-incinerator is increased.
(3) The capacity of the dryer-incinerator depends on the size of the dryer-incinerator; a larger dryer-incinerator is required for a larger dryer-incinerator capacity.
(4) In a continuous commercial process, it is just as important to obtain continuous and trouble-free operation of the pre-treatment and waste heat recovery systems as it is to have efficient dryer-incinerator operation.

Other objects and advantages of the invention will appear from the following description of preferred embodiments, reference being made to the accompanying drawing.

BRIEF DESCRIPTION OF THE DRAWING

The drawing is a schematic flow diagram indicating the processes and apparatuses according to the invention.

DESCRIPTION OF THE PREFERRED EMBODIMENTS

This invention is directed toward pre-treating and drying-incineration of oil field wastes, the oil field wastes containing drilling muds, contaminated sand, drill cuttings, and other solids, and which contain hydrocarbons up to 20% by mass. The invention contemplates drying-incineration of solids derived from oil field wastes, in the presence of a drying medium like air, over a wide range of temperatures and pressures in any suitable type of dryer or incinerator, to produce a condensable vapor, a non-condensable flue gas, and char solids.

In view of stricter regulations regarding the disposal of oil field wastes, methods currently in use are subject to continuing liabilities. For example, in certain geographical areas local regulations allow deep well injection of the wastes. In such disposal practices, it is possible for the well casing to fail, and for dangerous and toxic materials to contaminate aquifers. With changing subsurface hydrology practices, it is possible that in future years the depths of the aquifers will be at or near the locations at which the oil field wastes were disposed of earlier. In some locations, the impoundment of oil field wastes may be permitted in landfill locations. In such disposal, a barrier layer usually formed of clay, is placed about the disposal zone. In connection with this form of disposal of the oil field wastes, earthquakes or excessive movement of heavy machinery in the disposal area may result in failure of the barrier with resultant dispersal of the oil field wastes into water sources and other areas.

Referring now to the drawing, oil field wastes from a reserve pit, or from a drilling operation, onshore of off-shore, are usually processed in the field or on a drilling barge, to separate a solids mass from a slurry-liquid phase. While this separation may be done in a plant, it is usually done elsewhere and the solid mass a slurry-liquid delivered separately to the plant. The oil field wastes at 7 are separated as has been described by a screening apparatus 8, for example, a shale shaker, and the separated materials are delivered to the herein disclosed process, the solids mass at 14 and the slurry-liquids materials at 15. The solids mass received at 14 contain mainly drill cuttings. The slurry-liquids materials received at 15 contain mainly drilling mud fluids. The solids mass is usually received stored in metal containers, which are placed in one or more metal buildings 9, each container usually having a capacity of about 25 barrels. It is possible to receive the cuttings in various sizes of metal containers, or to receive them in barges, the latter being in the case of drilling fluid oil field wastes received from offshore locations. The storage buildings 9 for the metal containers should be covered so that rain water does not fall into the containers, as wetting of the cuttings results in additional load on the dryer-incinerator, to be described, causing increase of fuel requirements for the drying-incineration. The drill cuttings are delivered from the metal containers to a screening device 10. Use of this screening apparatus provides a uniform rate of feed to the dryer-incinerator and removes large objects such as packing material or other solid wastes which might have been dumped into the metal containers. The separated drill cuttings are loaded onto a belt conveyor 11 which feeds the dryer-incinerator 12. The drilling mud slurry and other fluid wastes are generally received in this process, at 15, in vaccuum trucks. However, it is possible to receive this material in barges in the case of offshore drilling locations. The liquid or slurry is stored in a plurality of storage tanks 16 after being screened by screen 17. The storage tanks 16 may be any number of storage tanks of any desired sizes. The slurry-liquid is delivered from storage tanks 16 to one or more mixing tanks 18 by one or more pumps 19. The mixing tanks 18 are provided with agitators for blending of the materials therein. Additives such as sulfuric acid and flocculating agents are added at 18a to the mixing tanks 18, and thoroughly blended with the slurry-liquid therein. One or more feed pumps 20 deliver the flocculated slurry-liquid from tanks 18 to one or more shale shakers 21, a shale shaker being a screening device. The screened slurry falls into a well 22, or holding tank, from which it is fed to a centrifuge 23 by one or more pumps 24. Centrifuge 23 is a highly efficient separation device which separates the flocculated solids from the remaining liquid. The liquid is called "centrate", and contains water, oil and salts. This liquid is sent to an oil-water separator 25 and aerated by air injected at 26. The resulting water discharged at 27 may be either reused or discharged to the environment. Oils are recovered at 30. The solids from the centrifuge are delivered onto the belt conveyor 11, which is the same conveyor handling the drill cutting solids. The petroleum phase from separator 25 discharged at 30 may be either reused or further processed for recovery of the hydrocarbons.

Conveyor 11 delivers the solids to a feeder 31 which delivers the solids into the dryer-incinerator 12. Feeder 31 includes a screw conveyor and at this point chemicals or other materials may be added to the solids to alter their characteristics. For example, Portland cement may be added, this material improving the leach characteristics of the char solids after they have been dried and incinerated.

The dryer-incinerator 12 may be of any suitable type which will cause drying and incineration of the solids. A preferred type of dryer-incinerator is an apparatus having trays to which the solids are successively delivered downwardly during drying-incineration. The number of trays and the size of the dryer-incinerator depends upon the required amount of drying-incineration. For instance, to process 1,000 barrels of mud slurry, per day, up to 25 trays may be required. One or more of the dryer-incinerator apparatuses may be employed. A dryer-incinerator distributed under the trademark TURBODRYER may be used. This dryer-incinerator includes an air heater 12a in which a fuel oil and preheated air are burned to create a hot gas drying medium. The hot gas drying medium, or flue gas, circulates upwardly through the trays of the dryer-incinerator to remove water vapor and other vapors such as hydrocarbon vapors therefrom and to produce a charred solid product at the bottom of the dryer-incinerator. The solid material is moved from tray to tray downwardly through the dryer-incinerator by scrapers, the final scrapers delivering the solids at discharge 33 from the dryer-incinerator. The air heater 12a receives preheated air from two waste heat recovery units 34, 35. The preheated air delivered through conduit 36 is burned with fuel oil introduced through conduit 37 to produce the heated gases which flow upwardly through the dryer-incinerator 12. The waste heat recovery unit 34 includes a metal conveyor which carries the solids in countercurrent flow with respect to air blown in at 38 and exited at 39.

Waste heat recovery unit 35 is a countercurrent flow indirect heat exchanger, flue gas from heater-incinerator 12 being delivered by blower 35a through heat exchanger 35, and air fed at 35b passing therethrough and exiting at conduit 39a to be delivered to the gas heater 12a. Heater-incinerator 12 operates at a temperature between 200° F. and 1500° F. Waste heat recovery unit 34 cools the solids discharged from the heater-incinerator to a temperature between 190° F. and 350° F. At this temperature, the cooled solids are safe to convey by rubber belt to a stockpile, and thence to disposal or to whatever use they may be found to be suitable for. The char solids are non-polluting. At this point, the solids may be sampled and analyzed for control purposes, for trace heavy metal content in paticular. Also if local or state law requires it, the solids can be tested for acid or distilled water leachables. If the leachables are high, then the amount of Portland cement introduced at feeder 31 may be increased to decrease the leachables. The flue gases from heater-incinerator 12 entering waste heat recovery unit 35 are cooled by indirect countercurrent contact with air from a temperature of between about 200° F. and 1500° F. to a temperature between about 200° F. and 700° F. The heating of the air delivered to the gas heater 12a results in a large saving in fuel cost to the heater-incinerator. The cooled flue gases from waste heat recovery unit 35 are delivered through a conduit 41 into another heat exchanger 42. In heat exchanger 42, air delivered thereto by blower 43 passes in indirect heat exchange with the flue gases to cool the flue gases to between about 95° F. and about 200° F. The partly vapor and partly condensed discharge from heat exchanger 42 is delivered to an accumulator 44, where the recovered oil and water separate out. The vapors leaving the accumulator are sent to a scrubber 45 by way of conduit 46. Pump 47 and circulation pipe 48 circulate an alkaline solution of caustic soda or other alkaline minerals such as lime or potash to remove the sulfur and nitrogenoxides from the flue gases. The treated flue gases are sent through conduit 49 to a flare where traces of hydrocarbons are burned.

The invention, as will now be understood, provides method and apparatus for treating used drilling muds and drill cuttings from well drilling operations. The drill cuttings and drilling mud solids are reduced to charred forms which may be safely and ecologically disposed of, or which may be processed for recovery of the drilling mud solids. The flue gases from the heater-incinerator are cleaned to the point where they may be flared to remove traces of hydrocarbon and then discharged to the atmosphere. The recovery petroleum may be used as is, if suitable, or may be refined and recovered as valuabel products.

While preferred embodiments of the methods and apparatus according to the invention have been disclosed and shown in the drawing, many modifications thereof may be made by a person skilled in the art without departing from the spirit of the invention, and it is intended to protect by Letters Patent all forms of the invention falling within the scope of the following claims.

I claim:

1. Process for treatment of oilfield wastes for disposal or recovery, the oilfield wastes including one or more types of drilling mud, drill cuttings and soil solids, petroleum, diesel and other oils, salts, and water, comprising separating the liquid components of said oilfield wastes from the solid components thereof by filtration to produce a filtrate, treating said filtrate with acid to reduce its pH and with a flocculating agent to flocculate solids therefrom and filtering said flocculated solids from the remaining liquid and combining same with said solid components, heating and incinerating said solid components at a temperature between about 200° F. (93° K.) and about 1500° F. (816° K.) with hot gases to produce char solids and flue gas containing materials vaporized from said solid components, cooling said char solids to a temperature between about 190° F. (88° K.) and about 350° F. (177° K.) by heat exchange with air to produce heated combustion air, cooling said flue gas to a temperature between about 200° F. (93° K.) and about 700° F. (371° K.) by heat exchange with air to produce condensed materials and additional heated combustion air, burning a fuel with said heated combustion air and said additional heated combustion air to produce said hot gases, and recovering said cooled char solids and said condensed materials for disposal or use.

2. Process according to claim 1, including centrifuging said remaining liquid to remove additional solids therefrom, and combining said additional solids with said solid components and said flocculated solids for said heating and incineration.

3. Process according to claim 1, including scrubbing said cooled flue gas with an alkaline solution and burning the scrubbed gas to remove any remaining hydrocarbons therefrom.

4. Process according to claim 1, said flue gases being further cooled by additional heat exchage with air to a temperature between about 95° F. (35° K.) and about 200° F. (93° K.).

* * * * *